United States Patent
Lee

(10) Patent No.: US 10,553,172 B2
(45) Date of Patent: Feb. 4, 2020

(54) DRIVE SYSTEM FOR TN LC BASE LCOS DISPLAYS

(71) Applicant: OmniVision Technologies, Inc., Santa Clara, CA (US)

(72) Inventor: Sinsuk Lee, Cupertio, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/972,081

(22) Filed: May 4, 2018

(65) Prior Publication Data

US 2019/0340992 A1 Nov. 7, 2019

(51) Int. Cl.
*G09G 3/36* (2006.01)
*G02F 1/1343* (2006.01)

(52) U.S. Cl.
CPC ........ *G09G 3/3685* (2013.01); *G02F 1/1343* (2013.01); *G02F 2201/123* (2013.01); *G09G 2310/08* (2013.01); *G09G 2320/066* (2013.01)

(58) Field of Classification Search
CPC .................................. G09G 3/36; G02F 1/333
See application file for complete search history.

(56) References Cited

U.S. PATENT DOCUMENTS

| 2009/0128722 A1* | 5/2009 | Kim | ...................... | G09G 3/3648 349/37 |
| 2011/0102404 A1* | 5/2011 | Hou | ...................... | G09G 3/3614 345/211 |
| 2012/0086733 A1* | 4/2012 | Hudson | ................ | G09G 3/3648 345/690 |
| 2016/0070147 A1* | 3/2016 | Kim | ...................... | G09G 3/3655 345/96 |
| 2016/0170524 A1* | 6/2016 | Kim | ........................ | G06F 3/044 345/174 |
| 2016/0259457 A1* | 9/2016 | Lee | ......................... | G06F 3/041 |

\* cited by examiner

*Primary Examiner* — Kenneth B Lee, Jr.
(74) *Attorney, Agent, or Firm* — Lathrop Gage LLP

(57) ABSTRACT

A liquid-crystal display (LCD) system with reduced artifact has LCD pixel cells with transparent and pixel electrodes. A timing control that switches one of the transparent and pixel electrodes in a sequence of high, common, low, and common voltages; synchronized to a timing control that switches a second electrode in a sequence of a first data-dependent, common, a second data-dependent, and common voltages. This new timing base LC voltage control enables smooth polarity switching that prevents optical side effects by excessive voltage across LC.

8 Claims, 4 Drawing Sheets

DRIVE SYSTEM FOR TN LC BASE LCOS DISPLAYS

BACKGROUND

Twisted nematic (TN) liquid crystal displays (LCD) have invaded all aspects of modern life. They generally rely on the light switching capabilities of pixel cells having a sandwich with a space containing a liquid crystal compound surrounded by electrodes, the sandwich being effectively placed between polarizing filters.

A typical TN-LCD cell has affects incident light according to FIG. 1. Note that response is bipolar—light transmission depends on the absolute value of the difference between electrode voltages, not on the polarity of the difference. The zone 50 of full light transmission may be interchanged with the zone 52 of black or opaqueness by rotating one of the polarizing filters, and for intermediate voltages 54 grey is obtained.

Reflective-mode LCOS (Liquid Crystal On Silicon) displays have one transparent electrode, typically formed of indium-tin-oxide (ITO) and one reflective electrode, typically formed of aluminum (AL), in alternative embodiments the reflective electrode may be formed of other reflective metals. In these displays, a single polarizing filter in front of the ITO electrode will allow incident light to enter and be reflected by the reflective electrode to leave the display through the ITO electrode with no voltage applied, but with a voltage between ITO and AL electrode polarization of passing light is rotated so light incident where the voltage is applied is blocked.

In some displays, it is desirable to alternate between operation in the negative-black region 56 with operation in the positive-black region 58 to better stabilize ions that accumulate in liquid crystals as they age.

In some displays, switching of polarity between the ITO 104 (FIG. 2) and AL or pixel 102 electrodes causes artifacts on the screen if the rise and fall times of signals applied to ITO and AL electrodes are not well matched because, although the relative voltages between ITO and AL electrodes start 106 and end 108 at the same value, they effectively "glitch," 110 to an unintended value across the liquid crystal pixel element during transitions. The liquid crystal pixel may respond to this glitch by changing the amount of light it passes.

Other problems may also afflict liquid crystal displays. For example, ionized salts may contaminate the LCD cell, or ionized salts may form as liquid crystals break down with age. When a salt-containing LCD cell first receives a voltage 150 (FIG. 3), the full electric field appears across the liquid crystals, but as ions are attracted to the electrodes, a space-charge 152 develops that eventually shields 154 the liquid crystals from applied voltage while voltage is applied, reducing display contrast. Further, when pixel data changes, the space charge can provide an image-memory effect 156.

SUMMARY

A liquid-crystal display (LCD) system with reduced artifact has LCD pixel cells with transparent and pixel electrodes. A timing control that switches one of the transparent and pixel electrodes in a sequence of high, common, low, and common voltages; synchronized to a timing control that switches a second electrode in a sequence of a first data-dependent, common, a second data-dependent, and common voltages.

DETAILED DESCRIPTION OF THE EMBODIMENTS

Figure 1:
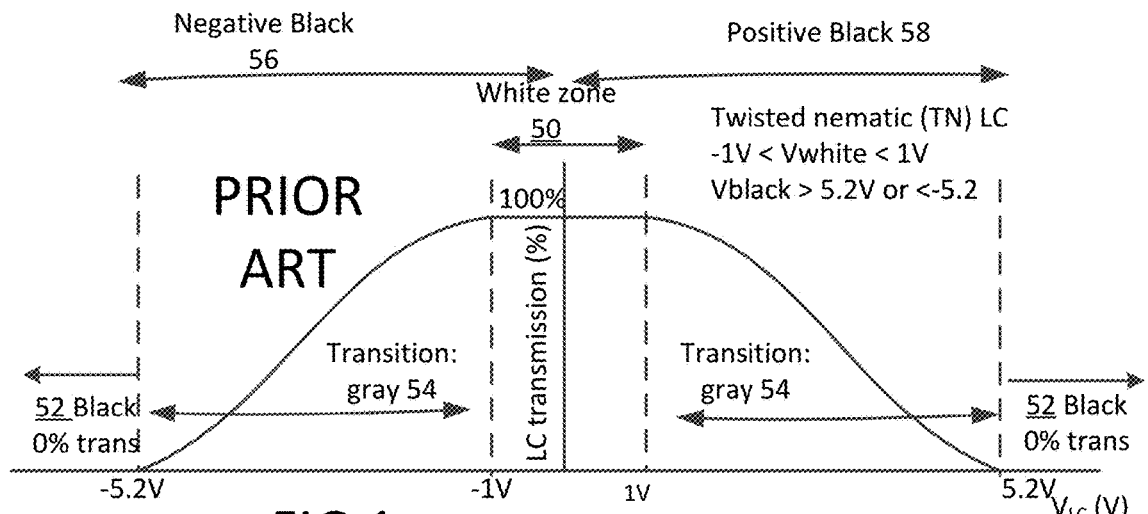
FIG. 1 illustrates optical response of a typical PRIOR-ART TN cell such as are used in most LCD panels.
Figure 2:
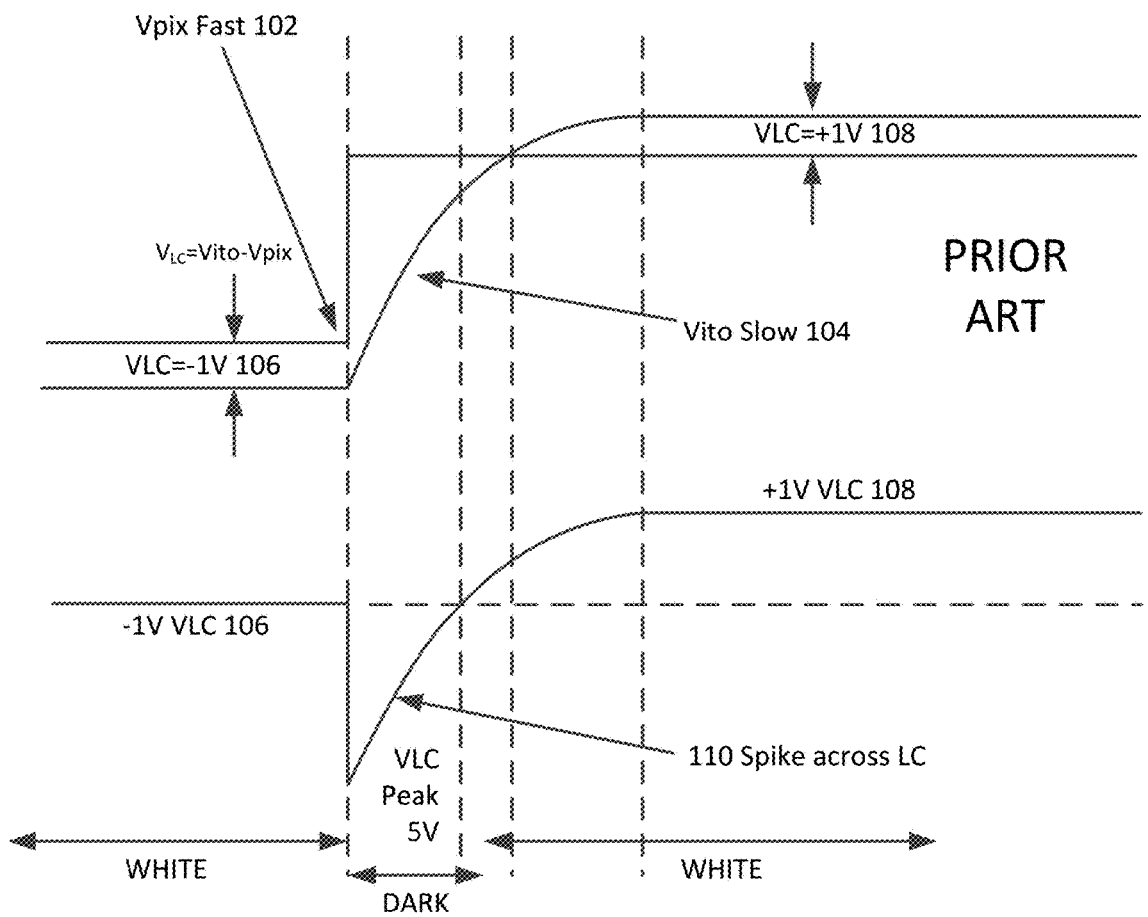
FIG. 2 illustrates glitches that may occur should transitions of PRIOR-ART ITO and pixel electrodes not be matched during a transition in a PRIOR-ART system.
Figure 3:
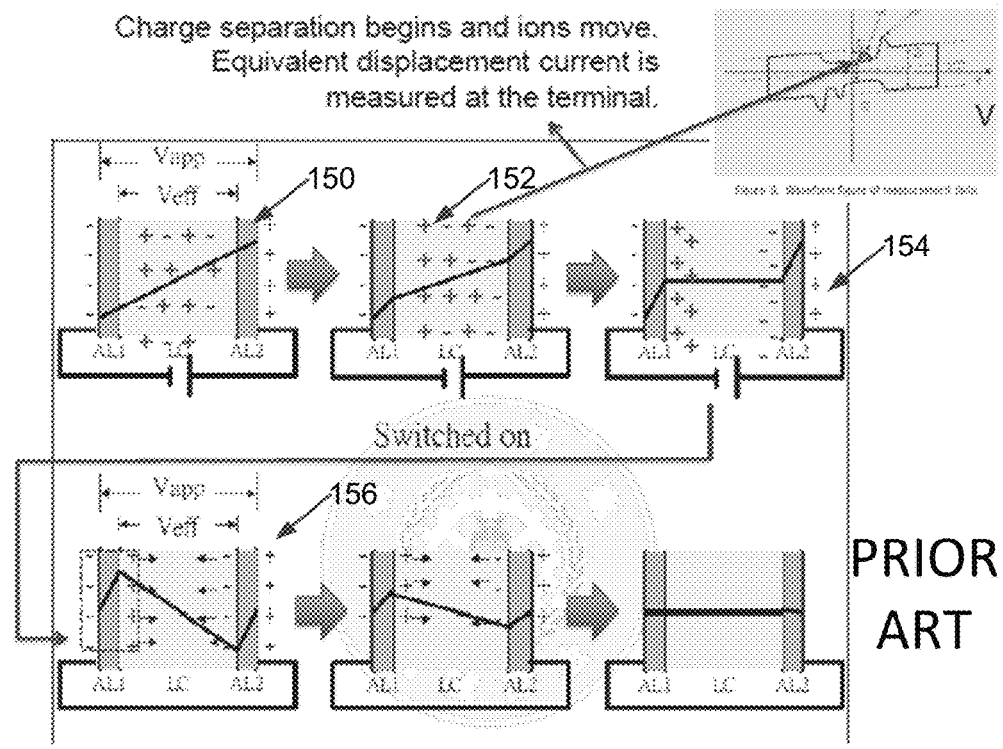
FIG. 3 illustrates a build-up of space-charge in a PRIOR ART TN-LCD that may shield the liquid crystal material from applied voltage and reduce contrast of an LCD display.
Figure 4:
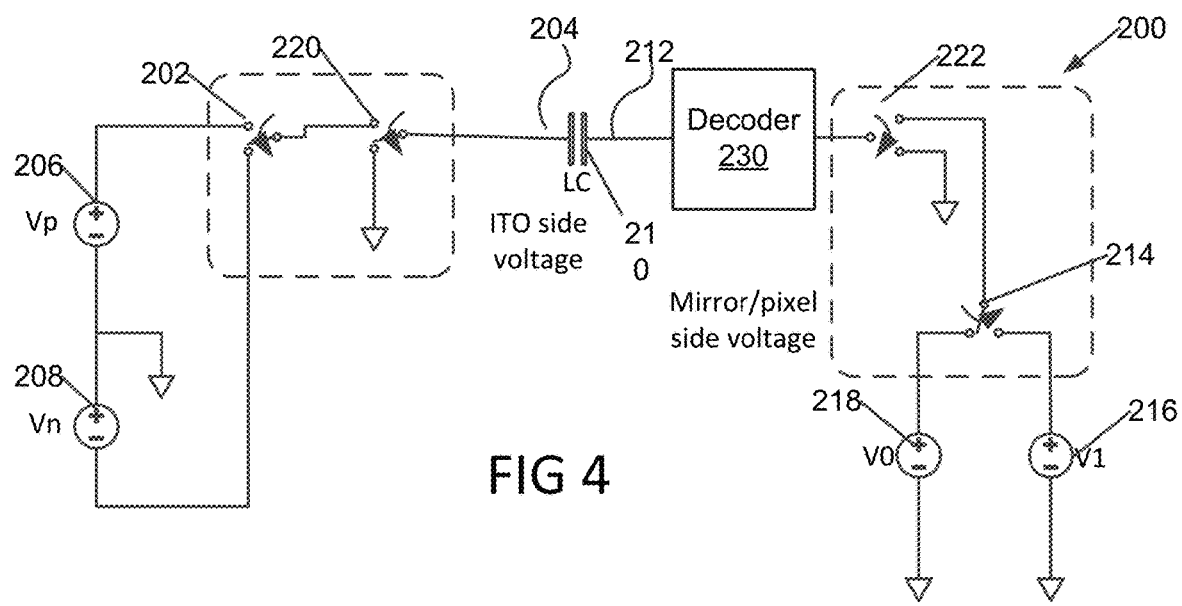
FIG. 4 is a circuit model of an improved Liquid Crystal drive system resistant to the artifacts discussed with reference to FIG. 2 and the space-charge effect discussed with reference to FIG. 3.

An improved Liquid Crystal (LC) drive system has an equivalent circuit 200 (FIG. 4). First switch 202 switches the indium-tin-oxide transparent electrode 204 from a positive voltage source 206 to a negative voltage source 208. Transparent electrode 204 is coupled to liquid crystal display cell 210. A second electrode, the reflective aluminum or pixel electrode 212 is coupled by a second switch 214 alternately to a logical high 216 and a logical low 218 source. There is also a ground-override switch 220 on the ITO side of LCD 210 and a ground override switch 222 on the pixel electrode side of LCD 210.

A multiplexing decoder 230 may be interposed between the pixel electrode 212 and the override switch 222. This decoder permits the same pixel electrode power supplies to drive multiple pixels.

Figure 5:
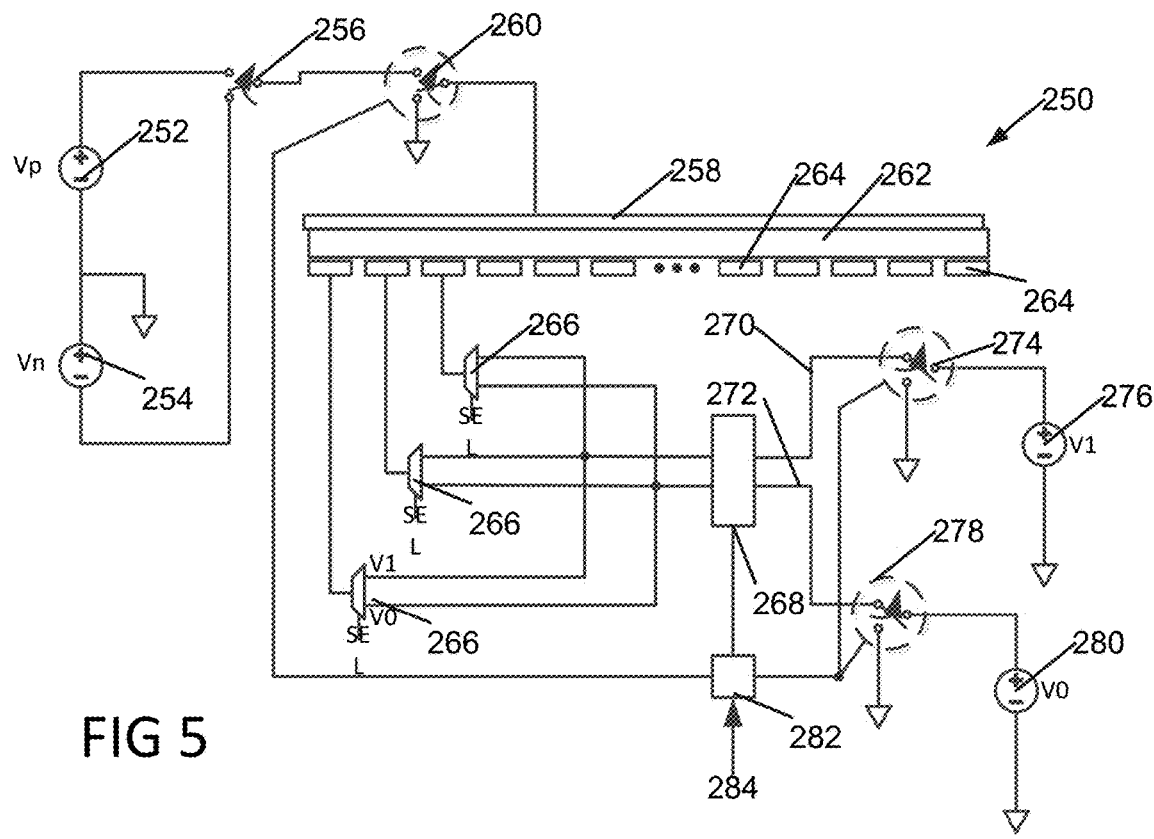
FIG. 5 illustrates circuitry of an embodiment.

In an embodiment 250 (FIG. 5), high 252 and low 254 ITO power couple through a multiplexor 256 and a transfer-gate/grounding switch device 260 to ITO electrode 258 of LCD devices 262. Pixel electrodes 264 of LCD device 262 couple through bidirectional data-controlled multiplexors 266 and a bidirectional time-controlled switch 268 to logic one rail 270 and logic zero rail 272. Logic one rail 270 couples through a time-controlled switch 274 to a logic one supply 276, while logic zero rail 272 couples through a time-controlled switch 278 to a logic zero supply 280. Time controlled switches 268, 278, 274, and transfer-gate/grounding switch device 260, all operate under control of a timing controller 282 according to a timing reference signal 284.

Figure 6:
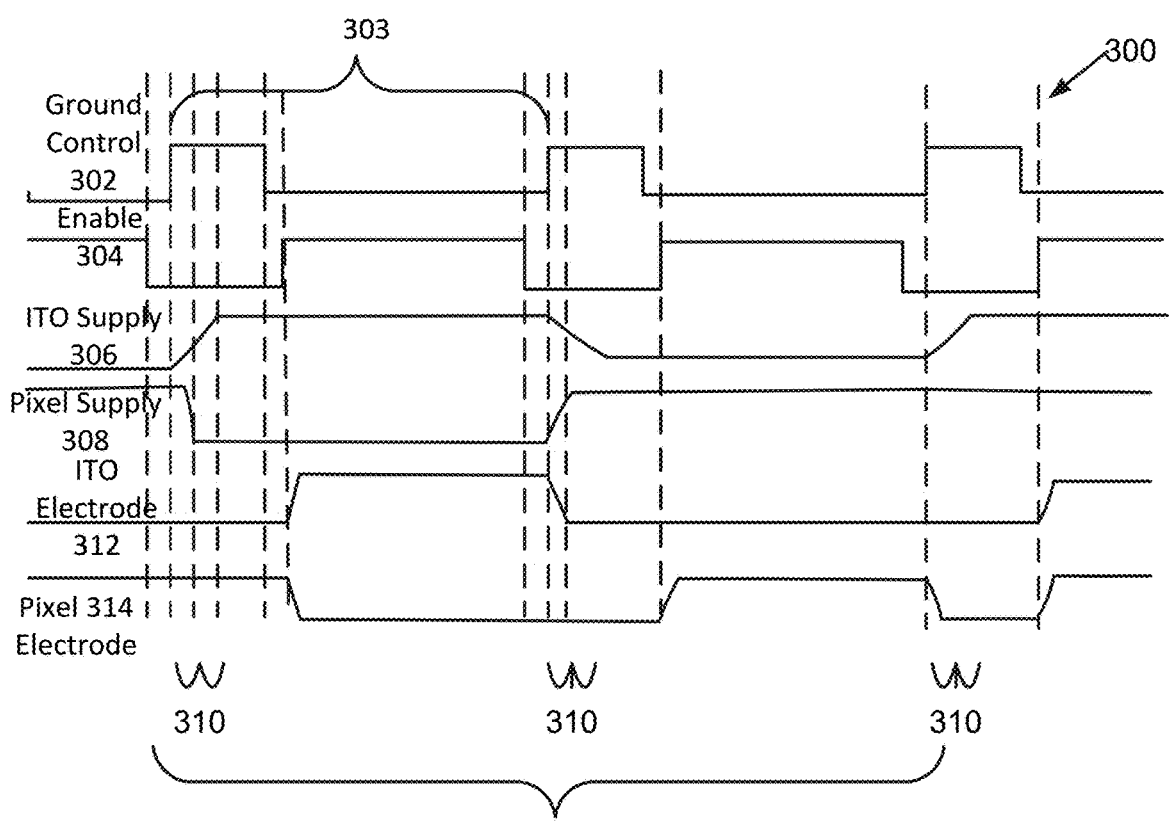
FIG. 6 illustrates waveforms used with the circuit model of FIG. 4.

In an embodiment, the system may operate with waveforms 300 (FIG. 6). In each cycle 301 of the ITO supply 252, 254, 256 (FIG. 5), 202, 206, 208 (FIG. 4), there are two cycles 303 of a ground control signal 302 that, when high, connects both plates 204, 212, 258, 264 of the LCD pixel cell to a common, or ground, signal thereby shorting across the LCD cell 210, 262. Between high values of the ground control signal 302, and nonoverlapping with it, is an enable signal pulse 304 that couples the ITO 252, 254, 256, 202, 206, 208 and pixel 281, 216, 214, 276, 280 supplies to the LCD pixel cell. By causing the switches 274, 278, 260, 220, 222, to disconnect the ITO and pixel supplies from the LCD pixel cells of the display, load is removed from the ITO and pixel supplies.

The ITO supply 306 switches during times the ground control signal 302 is active or high, as does the pixel supply 308. Since the enable signal pulse 304 is low during these times, the ITO supply and pixel supply are isolated from the LCD cell during this transition. These transitions occur during a transition window beginning as ground control signal 302 becomes active and ending at transitions finish.

After the ITO supply 306 and pixel supply 308 have fully switched, the enable signal pulse 304 rises, closing switches 220, 222, 260, 274, 278, allowing the ITO supply 306 and pixel supply 308 to propagate through to the LCD cell electrodes, where ITO voltage 312 changes after enable 304 rises. Since most load capacitance on ITO supply 306 is isolated from the ITO electrode 312, ITO electrode risetime is considerably shorter than ITO supply 306 risetime.

In an alternative embodiment the connections of the transparent or ITO electrode 258, and the reflective aluminum or pixel electrode 264 may be interchanged because it is the voltage difference between these electrodes, not which electrode is coupled to the data-controlled multiplexors 266 that makes the LCD cell 262 block or transmit light appropriately.

In typical embodiments, the common or ground voltage is coupled to the electrodes for a time determined by the ground override signal 302 that is far shorter than the time of each enable signal 304 of each cycle. In some embodiments the common or ground voltage may be the same as either the high or the low voltage applied to the ITO electrode.

Figure 7:
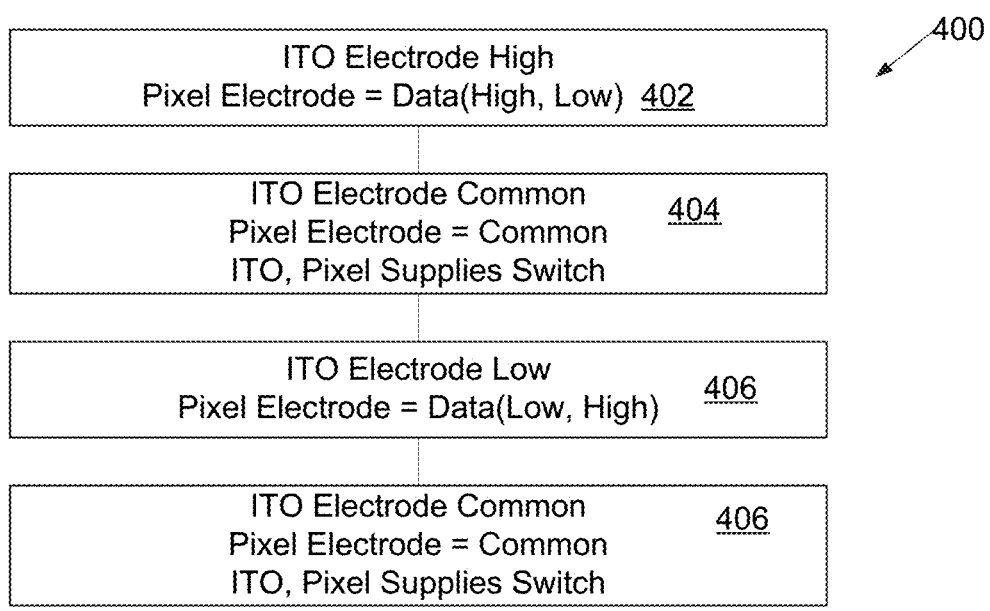
FIG. 7 is a flowchart illustrating the basic cycle of display operation.

As illustrated in FIG. 7 the display operates with a basic cycle 400 that includes charging the ITO electrode 258 high 402 through ITO supply 252, and switches 256, 260, while the pixel electrode is at a first data-dependent voltage selected from high and low. Both pixel and ITO electrodes are then driven 404 to a common or ground voltage. Next, ITO electrode 258 is driven 406 low through ITO supply 254 and switches 256, 260, while the pixel electrode is at a second data-dependent voltage opposite the first data voltage. Finally, before repeating the cycle, both ITO and pixel electrodes are driven 408 to the common or ground voltage again.

Combinations

The various features of the display system may be combined in various ways.

In an embodiment designated A, A liquid-crystal display (LCD) system with reduced artifact has at least one LCD pixel cell with a transparent electrode and a pixel electrode, and a timing control switching a first selected of the electrodes in a sequence of high, common, low, and common voltages. The embodiment also has the timing control synchronously switching a second selected electrode through a sequence of a first data-dependent, common, a second data-dependent, and common voltages.

An LCD display system designated AA including the system designated A has the transparent electrode is formed of indium tin oxide, is common to multiple LCD pixel cells, and is the first selected electrode.

An LCD display system designated AB including the system designated A or AA has the pixel electrode is formed of reflective metal.

An LCD display system designated AC including the system designated A, AA, or AB has the low and common voltages the same.

An LCD display system designated AD including the system designated A, AA, or AB has the high and common voltages the same.

A method of operating an LCD display system designated B configured to prevent visual artifacts while alternating high and low voltages on a first electrode common to multiple pixel cells cycles the first electrode through a sequence of high, common, low, and common voltages, and synchronously cycles a second electrode of at least one of the multiple pixel cells through a sequence of a first data-dependent voltage, the common voltage, a second data-dependent voltage, and the common voltage.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A liquid-crystal display (LCD) system with reduced artifact comprising:
    at least one LCD pixel cell comprising a transparent electrode and a pixel electrode,
    a timing control adapted to switch a first selected electrode selected from the transparent electrode and pixel electrode in a sequence of high, common, low, and common voltages;
    the timing control adapted to switch a second selected electrode selected from the transparent electrode and pixel electrode in a sequence of a first data-dependent, common, a second data-dependent, and common voltages;
    the timing control adapted to cyclically couple the common voltage to both the first and second selected electrodes simultaneously, the first and second data-dependent voltages to the first and second selected electrodes respectively, the common voltage to both the first and second electrodes simultaneously, and the first and second data-dependent voltages to the second and first selected electrodes respectively.

2. The LCD system of claim 1 wherein the transparent electrode is formed of indium tin oxide, is common to multiple LCD pixel cells, and is the first selected electrode.

3. The LCD system of claim 2 wherein the pixel electrode is formed of reflective metal.

4. The LCD system of claim 3 wherein the low and common voltages are the same.

5. The LCD system of claim 3 wherein the high and common voltages are the same.

6. A method of operating an LCD display system to prevent artifacts while alternating high and low voltages on a first electrode common to multiple pixel cells comprising:
    cycling the first electrode through a sequence of high, common, low, and common voltages, and
    synchronously cycling a second electrode of at least one of the multiple pixel cells through a sequence of a first data-dependent voltage, the common voltage, a second data-dependent voltage, and the common voltage;
    the common voltage being applied to the first and second electrodes simultaneously during the synchronous cycling of the first and second electrodes.

7. The method of claim 6 wherein the low and common voltages are the same.

8. The method of claim 6 wherein the high and common voltages are the same.

* * * * *